Patented May 29, 1951

2,555,057

UNITED STATES PATENT OFFICE 2,555,057

PROCESS FOR THE PRODUCTION OF PAPER COATING ADHESIVES

Laurence W. Porter, Westbrook, and Frank H. Jewett, II, Buxton, Maine, assignors to S. D. Warren Company, Boston, Mass., a corporation of Massachusetts No Drawing. Application December 10, 1947, Serial No. 790,920

10 Claims. (Cl. 260—17.3)

This invention relates to a process for the production of aqueous coatings for paper which when dried become water-resistant and which contain both an amylaceous adhesive and an alkaline pigment or filler.

It is well known that various papers such as printing papers, cover papers, paper-board, and the like are often coated during or after manufacture with pigmented coating compositions to improve the appearance and/or printing qualities of the paper product. Ordinarily the coating compositions used are aqueous suspensions of mineral pigment such as clay, calcium carbonate, blanc fixe, satin white, titanium dioxide or the like, and adhesive material such as casein, glue, modified starch, zein, or the like. After application of the coating composition the paper is dried and is then usually calendered and/or supercalendered to smooth the surface thereof.

In the past, casein has been the adhesive most commonly used in coating paper. Owing to the relatively high cost of casein, however, the much cheaper amylaceous adhesives such as modified starch and dextrin have to a large extent supplanted casein for this purpose. For some purposes, however, it is desired that the coated paper surface shall have some degree of water-resistance. For such papers casein is still largely used as adhesive in spite of its high cost, because of the water-resistance of its coatings and the well-known difficulties in achieving a satisfactory degree of water-resistance with starch adhesives.

U. S. Patent No. 2,399,489 discloses a method for the production of water-resistant coating when using starch as the adhesive. According to the patent an aqueous coating composition was made by preparing a suspension of dispersed pigment such as clay and gelatinized starch adhesive so that the pH value of the mixture was not over 7. To this was added an acid-curing resin such as a reaction product of an aldehyde with urea or melamine, and at the same time an acid-reacting curing catalyst such as ammonium chloride was added. When this composition was applied to paper, dried, and calendered, the coating had a water-resistance similar to that of casein coatings. When, however, a coating was made similarly except that it was maintained at a pH value slightly above 7, e. g. at 7.5, the dried coating had a water-resistance far inferior to that of casein coatings and not significantly greater than that of a starch coating containing no waterproofing agent.

It appears, therefore, that satisfactorily water-resistant starch containing coatings can be produced if they are kept slightly acid. In some cases, however, it is desired that the coating shall not be acid. For instance, some users demand an alkaline printing surface because of its advantage from the standpoint of quick ink-drying. Furthermore, some very desirable coating pigments are alkaline and impart pH values higher than 7 to coating compositions in which they are included. Calcium carbonate, for example, is a low cost pigment of high whiteness which is capable of imparting desirable qualities to the surface of printing paper when present in the coating thereon. But calcium carbonate, imparts to aqueous coating compositions and to coatings made therefrom pH values higher than 7.

The present invention has for an object the production of reliably water-resistant coatings containing calcium carbonate or other alkaline pigment and amylaceous adhesives.

Another object is to waterproof starch coatings under mildly alkaline conditions.

Another object is to combine a starch adhesive with an acid-curing aminoresin under controlled conditions at a pH above 7.

According to the invention an amylaceous adhesive, such as a heat-converted starch, in an aqueous suspension of pH value above 7, and preferably in the range 7.3 to 8.0, is heated, preferably with stirring to prevent the formation of lumps, with an acid-curing aminoresin such as the water-soluble reaction products of an aldehyde such as formaldehyde with a compound containing more than one amino group such as urea, thiourea, guanidine, melamine, etc., e. g. a ureaformaldehyde, melamine-formaldehyde, or thiourea-formaldehyde reaction product, until incipient thickening occurs. The result appears to involve a chemical reaction between the constituents of the resin or between the resin and the amylaceous substance or both and will be referred to hereinafter as such. The reaction is then quickly checked, preferably by admixture with an alkaline pigment and the product is used as adhesive in a coating composition containing an alkaline pigment such as calcium carbonate. The coating composition is spread on a paper surface, dried by heat, and smoothed as by calendering if desired. The coating so produced is satisfactorily water-resistant, and in cases where melamine-formaldehyde has been used it may be fully as water-resistant as a comparable water-proofed casein coating.

The heating and thickening of the mixture of the amylaceous substance and the resin must be carefully controlled. In particular it must be checked or slowed up before it has proceeded too far; otherwise the mixture or composition will set up to a rubbery mass entirely unsuitable for use in coatings. During the heating the aqueous suspension passes through a stage of minimum viscosity or maximum fluidity. The reaction should be checked at or near this point of minimum viscosity. Under preferred conditions the heated composition at about 50% solids is translucent and limpid. At about 185° F. it will flow smoothly from a spatula dipped therein; if the reaction is carried so far that the flow is stringy the viscosity of the final coating composition made therefrom is liable to be abnormally high and the composition may actually solidify before it can be incorporated in a coating mixture. Several steps suitably may be taken to check the reaction at the proper point. Included in such steps are the following: (1) decrease the temperature; (2) dilute the mixture; (3) agitate the mixture vigorously; and (4) raise the pH of the mixture slightly (but never above 9) and combinations thereof. It is essential that some such positive step be taken promptly when the reaction has proceeded to the desired degree. Vigorous agitation of the composition is practically an absolute requirement whatever other step or steps are taken.

The coatings of the invention can be applied by any of the usual methods. The coatings are particularly adapted for application by "machine-coating" processes because of the high solids content (from 40 to 60% solids) easily obtainable in such coating compositions. In order to attain the desired high solids content it is necessary that the amylaceous adhesive used shall itself be of a grade of adhesive which has a fairly low viscosity. For this reason the adhesives preferred for use are starches which have been converted by heat. Some grades of such heat-converted starches are sometimes called dextrins or British gums. It is possible under the invention, however, to use low viscosity oxidized starches or starches which have been converted by means of enzymes or by other means. Starch from corn (maize) is very satisfactory as the raw material for making such adhesives, but starch from other sources such as sago, tapioca, or potato starch may be used if desired.

The ratio of amylaceous adhesive to amino-resin may be varied over a considerable range depending upon the degree of water-resistance required in the completed coated paper. As little as 5% of resin on the weight of amylaceous adhesive imparts noticeable water-resistance to the product though better water-resistance is given by a higher proportion of the resin. Experience has shown, however, that no appreciable advantage is apparent in increasing the resin content over 30% of the weight of the amylaceous adhesive, though compositions containing a higher percentage of the resin can, of course, be used if desired.

During the reaction between the amylaceous adhesive and the aminoresin the pH value of the reaction mixture tends to drop slightly. For this reason care must be taken to ensure the presence of sufficient alkaline material to prevent the pH value from dropping below 7.0. The particular alkali used seems to be immaterial, provided the pH value of the mixture before reaction is not over 8.0 and the pH value when the reaction is checked is not below 7.0. Sodium carbonate is entirely satisfactory for use, but various buffer solutions have been used successfully, including a mixture of borax and hydrochloric acid.

In the finished coating composition the pH value must not be allowed to exceed 9.0, else the dried coating will not show satisfactory water-resistance. Ordinarily the pH can be regulated at a value not over 8.5, and it is preferred when possible to keep the pH value at from 7 to 8.

Paper may be coated with the compositions of the invention on one or both sides. Such coated paper is particularly adapted for offset or lithographic printing. The coated paper is sufficiently water-resistant not to be adversely affected by contact with moisture while being printed by the lithographic process.

As mentioned previously, coating compositions particularly adapted for use in machine-coating processes may be made according to the invention. A requirement for such machine-coating processes is that the coating composition shall have a low viscosity at a fairly high solids content. It is found that coatings made according to the invention need not have viscosities appreciably higher than comparable coatings made with the same amylaceous adhesive not subjected to the reaction with the aminoresin used under the present invention. That is to say, any amylaceous adhesive which per se can be used to give coatings of suitable viscosity and solids content for machine-coating can be treated with an aminoresin according to the invention and be used to make a similar coating composition having substantially the same viscosity. As a matter of fact in most cases the viscosity of the final coating composition is usually slightly reduced as a result of the practice of the invention.

An empirical test which is of practical value in predicting whether coated paper has properties favorable for the drying of lithographic ink thereon is the following:

Three drops of distilled water are placed on the coated paper surface and to the pool so formed is immediately added 1 drop of a standard indicator solution (0.04% Bromthymol Blue or 0.02% Phenol Red). The pool is vibrated gently until its color is uniform, and the color is then compared to that of standards of known pH value such as the well-known LaMotte standards.

It has been found that coated papers which by the aforementioned spot test give a value of less than 6.8 are liable, when printed by the lithographic process, to give trouble because the ink dries very slowly thereon. On the other hand, coated papers which give a test of above 8.3 are liable to cause emulsification of the printing ink, and so are undesirable. The coated papers of this invention all fall within these limits of 6.8 to 8.3. Preferably they are included in the limits 7.0–8.0. What is being measured by the spot test described is uncertain; possibly it is a sort of transient pH value. It can hardly be the true pH value of the coating, because if the coating is carefully scraped off the paper by means of a razor blade and then boiled up in distilled water the pH value of the aqueous extract, as measured by a glass electrode, will be found to be about 9 or higher, as would be expected in an aqueous dispersion of calcium carbonate.

Specific embodiments of the invention are illustrated by the following examples:

*Example 1*

1050 lbs. of heat-converted, low-viscosity corn starch was stirred into 215 gal. of cold water having dissolved therein 2 lbs. 5 oz. of sodium carbonate, and was stirred until free from lumps. Then was added 320 lbs. of powdered water-soluble commercial melamine-formaldehyde reaction product, and the mixture was stirred until free from lumps. At this point the pH value of the mixture was 7.3. Vigorous agitation was continued while the temperature was raised by admission of steam to a jacket surrounding the reaction tank. In 45 minutes the temperature of the mix had risen to 185° F. and the point of apparent minimum viscosity had been reached. The mixture was then pumped as quickly as possible into an empty mixing tank, and 280 gal. of cold water was immediately added together with 450 lb. of dry finely divided calcium carbonate of paper coating quality. The mixture was stirred for 15 minutes until it appeared to be smooth and free from lumps of pigment. Then was added 2550 lbs. of clay previously made into a slurry of 65% solids. The mixture now had a pH value of about 7.7. The coating was applied to both sides of a somewhat absorbent rosin-sized clay-filled paper body stock by means of a pair of squeeze-rolls to make so-called "machine-coated" paper. The paper was dried with heat and calendered. The finished paper was satisfactory for offset printing and was as satisfactorily water-resistant as a comparable grade of paper made with water-proofed casein adhesive. The finished paper surface when tested with a spot indicator gave a test corresponding to a pH of 7.3.

*Example 2*

To 152 gallons of water having dissolved therein 1.77 lbs. of soda ash was added 780 lbs. of low-viscosity heat-converted starch. This mixture was stirred until free from lumps, when 234 lb. of dry water-soluble melamine-formaldehyde reaction product was added and likewise stirred until free from lumps. The mixture was then heated by steam jacket with agitation. The temperature was raised to 185° F. and held there for about 15 minutes until incipient thickening was observed. The mix was then dropped quickly into an empty tank and diluted with 40 gallons of cold water. Then 450 lb. of paper coating grade dry calcium carbonate was stirred in immediately, and agitation was continued for 15 minutes until no lumps were apparent. Finally 1800 lbs. of fine coating clay in 70% aqueous suspension was stirred in. The coating composition was finally passed through a hammer-mill and applied by means of a squeeze-roll type coating machine to one side of a sized clay-filled paper body stock. The weight of dry coating applied was 10 pounds per 500 sheets cut 25" x 38". The so-coated paper was dried by heat and super calendered. The product was printed by a lithographic process, and was also successfully varnished with spirit varnish. The paper was satisfactorily water-resistant; it could be rubbed with a wet finger without having the coating loosened. The pH value of the reacted starch mixture was 7.2; that of the completed coating composition was 7.8; and the spot-test figure for the surface of the dry coated paper was 7.3.

*Example 3*

Into 170 gallons of water containing 1.8 lb. of soda ash dissolved therein was stirred 840 lbs. of corn-starch having low-viscosity properties as a result of dextrinization. Then 250 lb. of di- methylol urea was added, and the mixture was stirred until free from lumps. The mix was heated in a steam-jacketed reaction tank while good agitation was maintained. The temperature was raised to 185° F. and held there for about 20 minutes until incipient thickening was observed. The mix was at once poured into a cold empty tank and immediately diluted with 220 gallons of cold water. At the same time 360 lb. of dry coating-grade calcium carbonate was stirred in. After 15 minutes of agitation there was added 2000 lbs. of coating clay previously made into an aqueous slurry of 66% solids. The pH value of this converted coating composition was 7.8; that of the reacted starch-dimethylol urea mixture was 7.2. The coating composition was applied by a squeeze-roll coater to both sides of a sized paper body stock, about 8 pounds dry weight (25" x 38"—500) being applied to each side. The coated paper was dried and super calendered. The finished product was satisfactorily wet-rub resistant and was printed by the offset process. The figure for the surface spot-test was 7.2.

*Example 4*

280 parts by weight of oxidized (chlorinated) corn starch of low-viscosity was stirred into 1070 parts by weight of water containing 0.25 part by weight of sodium carbonate. Next was stirred in 84 parts by weight of powdered, water-soluble, commercial melamine-formaldehyde reaction product. The pH of this mixture was 8.0. The mixture was stirred constantly and the temperature was gradually raised to 185° F. where it was held for 10 minutes, until it was obvious that the point of minimum viscosity had been passed. The pH value of the mixture was then 7.2. The mixture was then quickly added to 200 parts by weight of dry coating-quality calcium carbonate and stirred until smooth. Then was added 1190 parts by weight of a clay slip containing 67% solids. The final coating mixture had a pH value of 7.9 and a solids content of about 48%. This coating mixture was applied to both sides of an absorbent, sized paper body-stock by a squeeze-roll coater, dried by heat, and calendered. About 6 pounds of dry coating was applied per side (25" x 38"—500 sheet basis). The coated paper was satisfactorily water-resistant and suitable for use on an offset printing press. The spot-test figures for the coated surface was 7.2.

*Example 5*

Into 300 parts by weight of water containing dissolved therein 0.63 parts by weight of soda-ash was stirred 280 parts by weight of low-viscosity dextrinized corn starch and 84 parts by weight of a water-soluble commercial melamine-formaldehyde reaction product. The mixture was stirred until free from lumps. Its pH value at this point was about 7.4. The mixture was heated by steam-jacket to 185° F., with agitation, and held at about 185° F. until incipient thickening was observed (about 15 minutes). The pH value at this point was about 7.1. The mixture was diluted and cooled by addition of 660 parts by weight of cold water, and 1000 parts by weight of dry coating-grade calcium carbonate was immediately stirred in until the mixture was free from lumps and smooth. The coating composition so formed had a pH value of about 8.2. This coating composition was applied by means of a squeeze-roll coater to both sides of a sized, clay-filled body-stock, and the coated sheet was dried by heat and then supercalendered. The coat product had considerable, but not perfect, wet-rub resistance, and was satisfactorily water-resistant for use on an offset printing press. The spot-test figure for the coated surface was about 8.0.

Example 6

Water 380 parts by weight, soda-ash 0.63 parts by weight, dextrinized corn starch 280 parts by weight, and water-soluble thiourea-formaldehyde reaction product 84 parts by weight were mixed together until free from lumps and then heated by jacket steam at a temperature above 185° F. until the point of minimum viscosity had been passed. The pH of the mixture at this point was 7.1. The reacted mixture was then diluted with 305 parts by weight of cold water and mixed with 200 parts by weight of dry coating-quality calcium carbonate which was stirred in until smooth. Then 1230 parts by weight of a 65% suspension of coating clay was stirred in. The pH of the mixture was 7.4. The mixture was screened and applied by means of squeeze-rolls to both sides of sized paper body stock, about six pounds dry weight being applied to each side. The coated paper was dried by heat and supercalendered. It was satisfactorily water-resistant and was suitable for offset printing. A spot-test on its surface gave a figure of 7.0.

Example 7

A mixture of 364 parts by weight of water, 0.63 parts by weight of sodium carbonate, 280 parts by weight of low-viscosity acid-hydrolyzed corn starch, and 84 parts by weight of water-soluble melamine-formaldehyde reaction product was stirred until free from lumps, and then heated by steam-jacket to 185° F. where it was held under agitation until incipient thickening was observed. The pH value of the reacted mixture was about 7.2. The reacted mixture was immediately cooled and diluted with 320 parts by weight of water and 200 parts by weight of coating-grade calcium carbonate was stirred in until free from lumps. Finally 800 parts by weight of coating clay, made into 1230 parts by weight of aqueous slurry, was stirred in. The resulting coating composition had a pH value of about 7.5. This coating composition was applied by squeeze-rolls to both sides of a sized body-stock which was then heat-dried and supercalendered. The coated paper was satisfactorily water-resistant and suitable for offset printing. It showed a surface spot-test value of 7.0.

Example 8

A mixture of 240 parts by weight of water, 0.63 parts by weight of soda ash, 280 parts by weight of low-viscosity dextrinized corn starch, and 14 parts by weight of water-soluble melamine-formaldehyde reaction product (5% on weight of starch) was heated by steam-jacket to about 195° F. for 15 minutes. The pH value of the reacted mixture was about 7.1. The mixture was cooled and diluted with 388 parts by weight of cold water, and 200 parts by weight of dry coating-grade precipitated chalk was stirred in until free from lumps. Then 1230 parts by weight of a 65% slurry of coating clay was added. The pH value of this coating composition was about 7.6. The composition was applied by squeeze-rolls to both sides of a sized paper body-stock; the coated paper was heat-dried and supercalendered. The coated paper was fairly satisfactory for offset printing but its water-resistance, while considerable, was less than was desirable for some purposes. When rubbed briskly with a wet finger considerable coating was rubbed off. The surface spot-test observed was 7.0.

Example 9

A mixture of 252 parts by weight of water, 0.63 parts by weight of soda ash, 280 parts by weight of low-viscosity dextrinized corn starch, and 28 parts by weight of water-soluble melamine-formaldehyde reaction product (10% on weight of starch) was heated by steam-jacket to 200° F. for 10 minutes with constant agitation. The pH value of the cooked mixture was 7.1. The reacted mixture was simultaneously cooled and diluted with 390 parts by weight of cold water, and 200 parts by weight of coating-quality calcium carbonate was stirred in until the mixture was smooth. Then 800 parts by weight of coating clay made into a slurry of 65% solids was stirred in. The pH of the coating composition so made was 7.4. This composition was applied by squeeze-rolls to both sides of sized paper body stock, dried and supercalendered. The product was satisfactory for offset printing, and had fair resistance to wet-rub, though it was less resistant than the product of Example 1. The surface spot-test figure was 7.4.

Example 10

To a mixture of 520 parts by weight of water and 280 parts by weight of tapioca or cassava starch which had been converted by treatment with 1.68 parts by weight of a liquifying enzyme was added 0.63 parts by weight of soda ash and 84 parts by weight of water-soluble melamine-formaldehyde reaction product. The mixture was stirred and heated to 205° F. for 10 minutes. The pH value of this reacted mixture was 7.2. The mixture was immediately cooled and diluted with 415 parts by weight of water and 200 parts by weight of coating grade calcium carbonate was stirred in until free from lumps. Then was added coating clay 800 parts by weight, dispersed in 430 parts by weight of water. The pH value of this coating composition was 7.4. The composition was applied by means of squeeze-rolls to both sides of a sized paper body-stock, and the coated paper was dried and supercalendered. The product was very resistant to wet-rub, and was satisfactory for lithographic printing. The surface spot-test figure was 7.0.

Example 11

A mixture of 310 parts by weight of water, 0.63 parts by weight of soda ash, 280 parts by weight of dextrinized potato starch, and 84 parts by weight of water-soluble melamine-formaldehyde reaction product was heated to 200° F. for 15 minutes until it was apparent that the point of minimum viscosity had been passed. The pH value of the reacted mixture was 7.1. The mixture was immediately cooled and diluted with 375 parts by weight of water, and 200 parts by weight of coating-grade calcium carbonate was stirred in until smooth. Then 800 parts by weight of coating clay was added, dispersed in 430 parts by weight of water. The pH value of the complete coating composition was 7.6. The coating composition was applied by squeeze-rolls to both sides of sized paper body-stock, and the coated paper was dried and supercalendered. The product had good wet-rub resistance and was satisfactory for lithographic printing. The surface spot-test figure was 7.0.

The heating temperature employed in effecting the chemical reaction between the aminoresin and the amylaceous adhesive within a reasonable time must be at least about 140° F. A higher temperature of the order of 160° F. is preferred even when the amylaceous adhesive is a so-called cold-water-soluble dextrin. A higher temperature of the order of 160° F. or higher is essential when the amylaceous adhesive is a converted starch which requires such higher temperature to insure its gelation. The maximum heating temperature has not been determined but may be as high as 212° F.

We claim:

1. Process for the production of a paper coating composition which comprises heating a mixture of an amylaceous material and a water-soluble, acid-curing aminoresin formed by reacting an aldehyde with a compound containing more than one amino group, in an aqueous medium maintained at a pH value of from 7 to 8 at an elevated temperature until the mixture attains substantially its minimum viscosity and quickly checking the reaction at this point by vigorously agitating the mixture with the addition of water and finely divided calcium carbonate pigment.

2. Process as defined in claim 1 in which the amylaceous material is a converted starch adhesive.

3. Process as defined in claim 1 in which the aminoresin is a melamine-formaldehyde reaction product.

4. Process as defined in claim 1 in which the aminoresin is a urea-formaldehyde reaction product.

5. Process as defined in claim 1 in which the aminoresin is a thiourea-formaldehyde reaction product.

6. Process as defined in claim 1 in which the elevated temperature is at least about 140° F.

7. Process as defined in claim 1 in which a substantially homogeneous mixture comprising the water, the amylaceous material and the aminoresin is formed at substantially room temperature and the temperature of the mixture is then raised gradually to about 185° F.

8. Process as defined in claim 1 in which the quantity of aminoresin in the aqueous medium amounts to from about 5% to about 30% of the amylaceous material by weight.

9. Process which comprises forming a mixture consisting essentially of water, aminoresin formed by reacting an aldehyde with a compound containing more than one amino group, and converted starch, the aminoresin amounting to from about 5% to about 30% by weight of the converted starch, the mixture having a solids content of at least about 25% and a pH value within the range of 7 to 8, heating the mixture at an elevated temperature to the point of incipient thickening, checking the reaction before the point of incipient thickening has been passed by agitating, cooling and diluting the mixture and incorporating therein calcium carbonate pigment.

10. Process which comprises forming a mixture consisting essentially of water, aminoresin and converted starch, the aminoresin formed by reacting an aldehyde with a compound containing more than one amino group, amounting to from about 5% to about 30% by weight of the converted starch, the mixture having a solids content of at least about 25% and a pH value within the range of 7 to 8, heating the mixture at an elevated temperature to the point of incipient thickening, discontinuing the heating and checking the reaction before the point of incipient thickening has been passed by agitation and the addition of calcium carbonate pigment.

LAURENCE W. PORTER.
FRANK H. JEWETT, II.

REFERENCES CITED

The following references are of record in the file of this patent:

UNITED STATES PATENTS

| Number | Name | Date |
|---|---|---|
| 2,302,309 | Glarum et al. | Nov. 17, 1942 |
| 2,322,887 | Schwartz et al. | June 29, 1943 |
| 2,399,489 | Landes | Apr. 30, 1946 |